United States Patent [19]

Gocho

[11] 4,119,862

[45] Oct. 10, 1978

[54] CONTROL APPARATUS OF ELECTRIC MOTOR CARS

[75] Inventor: Choichi Gocho, Tokyo, Japan

[73] Assignee: Tokyo Shibaura Denki Kabushiki Kaisha, Kawaski, Japan

[21] Appl. No.: 617,376

[22] Filed: Sep. 29, 1975

[30] Foreign Application Priority Data

Sep. 30, 1974 [JP] Japan .................... 49-112628

[51] Int. Cl.² .................................. B60L 11/12
[52] U.S. Cl. .................................. 290/17; 180/65 B
[58] Field of Search .............. 290/8, 9, 10, 14, 15, 290/16, 17, 41, 50; 318/139; 322/25, 29, 36; 180/65 C, 65 B

[56] References Cited

U.S. PATENT DOCUMENTS

| 3,374,419 | 3/1968 | Williamson | 322/72 |
| 3,487,291 | 12/1969 | Dowgiallo | 318/139 |
| 3,503,464 | 3/1970 | Yardney | 290/16 |
| 3,525,924 | 8/1970 | Atterholt | 322/26 |
| 3,605,006 | 9/1971 | Nagae | 322/24 |
| 3,621,370 | 11/1971 | Vandervort | 322/36 |
| 3,713,504 | 1/1973 | Shimer | 180/65 R |
| 3,792,327 | 2/1974 | Waldorf | 290/50 |
| 3,878,400 | 4/1975 | McSparran | 290/17 |

*Primary Examiner*—Robert K. Schaefer
*Assistant Examiner*—William L. Feeney
*Attorney, Agent, or Firm*—Stevens, Davis, Miller & Mosher

[57] ABSTRACT

An electric motor car wherein an electric motor for driving the car is energized by a fuel engine driven generator and a battery is connected in parallel with the motor to be float charged by the generator. Control apparatus is provided for always maintaining the output of the generator at a constant value irrespective of variations in the load and for supplying the varying component of the load from the battery.

3 Claims, 4 Drawing Figures

CONTROL APPARATUS OF ELECTRIC MOTOR CARS

BACKGROUND OF THE INVENTION

This invention relates to a control apparatus for an electric motor car, more particularly a battery car having a battery and a fuel engine driven generator for float charging the battery, usually called a hybrid car.

Recently, the problem of contaminating the atmosphere by gas exhausted from the internal combustion engines of motor cars has become important from the standpoint of public health, and various regulations for the content of exhaust gas are being enforced. Accordingly, research is being conducted in many countries regarding harmless electric motor cars or hybrid cars.

However, in a hybrid car having a horse power comparable with that of an ordinary gasoline engine driven motor car, about one-third of the weight of the car is due to electric components, including a battery, an electric motor and a controller. With a battery car, the running distance for each charge is only about 100 kilometers. Where it is necessary to frequently stop and run the car, as occurs when traveling through a city area, the running distance per charge decreases further. Even when a more efficient battery is developed in the future, due to the losses occurring at the time of charging and discharging, it will be necessary to charge the battery with an energy higher than that of the discharge.

Accordingly, for the purpose of increasing the running distance of a hybrid car and obtaining high speed characteristics comparable with those of conventional gasoline engine driven motor cars it has been proposed to use an engine driven generator for float charging the battery. With this type of an electric motor car, so long as a variable load is imposed upon the engine as in conventional motor cars, the amount of exhaust gas can not be decreased because the exhaust gas is relatively clear or harmless and the fuel efficiency is high only when the internal combustion engine is operated at a constant speed and under a constant load. It is known that when an ordinary motor cars runs through a city area the fuel efficiency drops to about one-third of the best value because it is necessary to frequently stop and run the car or to operate the engine under load and no load conditions.

It is a recent trend to use a hybrid car wherein a brushless three phase alternator is used, the AC output power of the alternator is rectified to obtain direct current for charging a battery, and a variable frequency, variable voltage inverter is used to convert the battery power into three phase alternating current which is used to energize a three phase induction motor that drives the car. This system has the same problems as those described above.

SUMMARY OF THE INVENTION

It is an object of this invention to provide novel control apparatus for an electric motor car or a hybrid car of the type wherein an electric motor for driving the car is energized by an engine driven generator and a battery is connected in parallel with the motor to be float charged by the generator and wherein control is effected such that the output of the generator is always maintained at a constant value irrespective of the variation in the load and that the varying component of the load is supplied by the battery thereby increasing the fuel efficiency of the engine and decreasing fuel consumption and polution of the atmosphere caused by the exhaust gas of the engine.

Another object of this invention is to provide an improved control apparatus for a hybrid car of the type including a fuel engine driven alternator, a rectifier, a battery charged by the rectifier, a variable frequency, variable voltage inverter connected in parallel with the battery and an induction motor energized by the output of the inverter for driving the car.

Still another object of this invention is to provide an improved control apparatus for a hybrid car which can improve the fuel efficiency of the engine and decrease fuel consumption and pollution caused by the exhaust gas of the engine and hence suitable to run the car in city areas where the car stops and starts frequently.

A further object of this invention is to provide control apparatus for a battery car capable of operating an engine driven generator as a motor for starting the engine when the residual capacity of the battery decreases thereby recharging the battery.

Another object of this invention is to provide novel control apparatus for a hybrid car capable of limiting the output power of the generator to any desired value.

Yet another object of this invention is to provide control apparatus for a hybrid car capable of limiting the field current of the generator to a safe value.

These and further objects of this invention can be accomplished by providing control apparatus for a motor car wherein a generator is driven by a fuel engine, the driving motor of the car is energized by the generator and a battery is connected in parallel with the motor to be float-charged by the generator. The control apparatus comprises means for detecting the electric output power of the generator, means for varying the output from the generator output power detecting means in accordance with the running condition of the car, means for producing a reference signal, and means for comparing the output from the generator output power detecting means with the reference signal for adjusting the field current of the generator thereby maintaining the output of the generator at a substantially constant value irrespective of the running condition of the car.

As described above, it is a recent trend to use a three phase induction motor as the driving motor of the car and energize the induction motor from a variable frequency, variable voltage inverter. In this case, the engine driven generator comprises a three phase alternator and a rectifier is connected between the alternator and the inverter and the battery. According to this invention control apparatus capable of accomplishing various objects described above is also provided for such electric car.

DESCRIPTION OF THE PREFERRED EMBODIMENT

Figure 1:
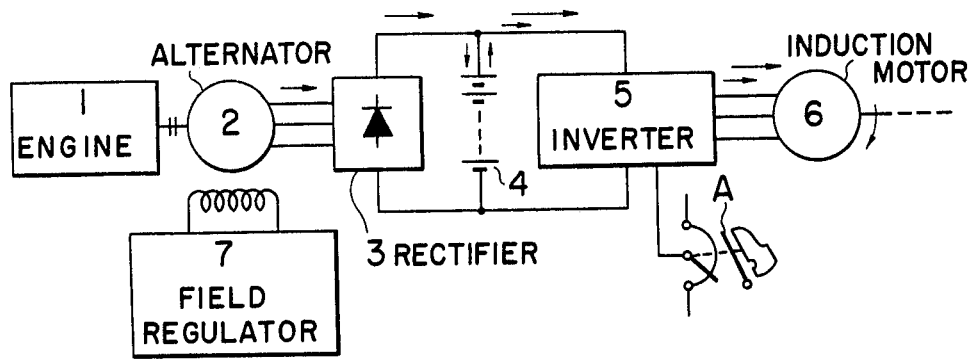
FIG. 1 is a block diagram showing the connection of the main circuit of a hybrid car to which the invention is applicable.

Referring now to FIG. 1, the electric motor car or hybrid car comprises a fuel engine 1 such as an internal combustion engine or a gas turbine engine, a three phase alternator 2 driven by the engine, a full wave rectifier 3 for rectifying the AC output of alternator 2, a battery 4 connected to be float charged by the DC output from rectifier 3 and an inverter 5 including a control circuit to be described later and connected across the battery 4. A gate control circuit for the inverter which is designed to generate variable voltage, variable frequency three phase alternating current by the manipulation of an acceleration pedal A is also provided and will be described later in detail. A three phase induction motor 6 is energized by the output from the inverter. Alternator 2 is provided with a field regulator 7 which functions to maintain the output of the alternator at a constant value.

With this construction, although it is possible to run the motor car at any speed by the manipulation of the acceleration pedal A, the driving motor 6 is liable to be subjected to a greatly varying load due to the characteristics of the car at the time of acceleration, deceleration, climbing up a slope, idling, etc. Although the effect of the load variation upon the alternator can be alleviated by greatly increasing the capacity of battery 4 with respect to that of alternator 2, it is evident that such construction is not practicable. Accordingly, if the capacity of the battery is coordinated with the car construction, both the battery and alternator would be adversely affected by the load variation. As the engine driven alternator and the battery are connected in parallel, when the load varies the alternator and the battery will share the load among them according to their characteristics.

As has been pointed out hereinabove, when the engine is operating at a constant speed and under a constant load the exhaust gas is relatively clear and the fuel efficiency is high. According to this invention, the control is effected such that the variable component of the load is supplied by the battery having a relatively small capacity and that the constant component of the load is supplied by the engine driven alternator. Further, in order to prevent burn out of the alternator which may occur as a result of such control the maximum voltage and the maximum current of the alternator are limited, and the maximum field current thereof is also limited.

Figure 2A:
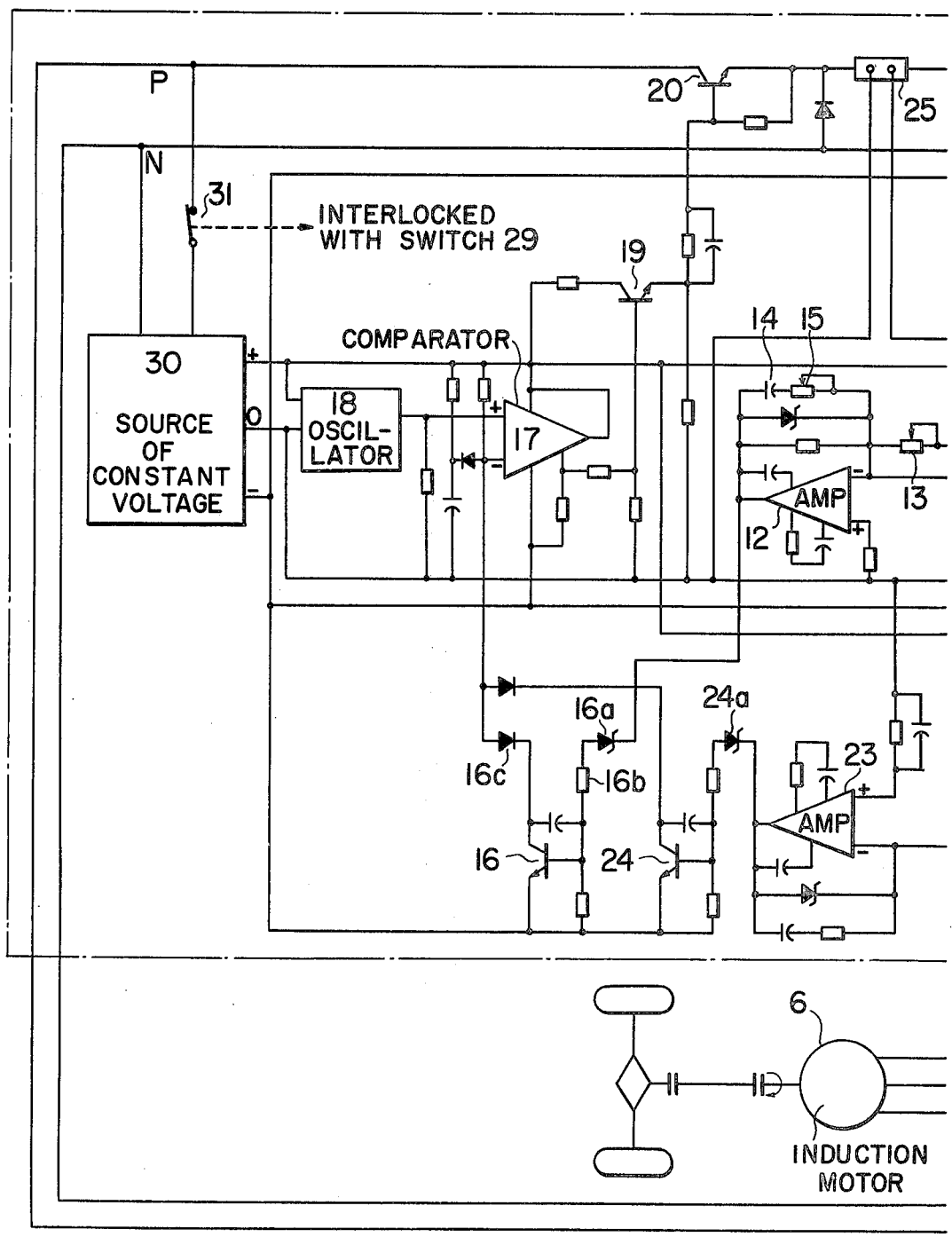
FIGS. 2a and 2b, when combined, show the connection diagram of the novel control circuit of a hybrid car.
Figure 2B:
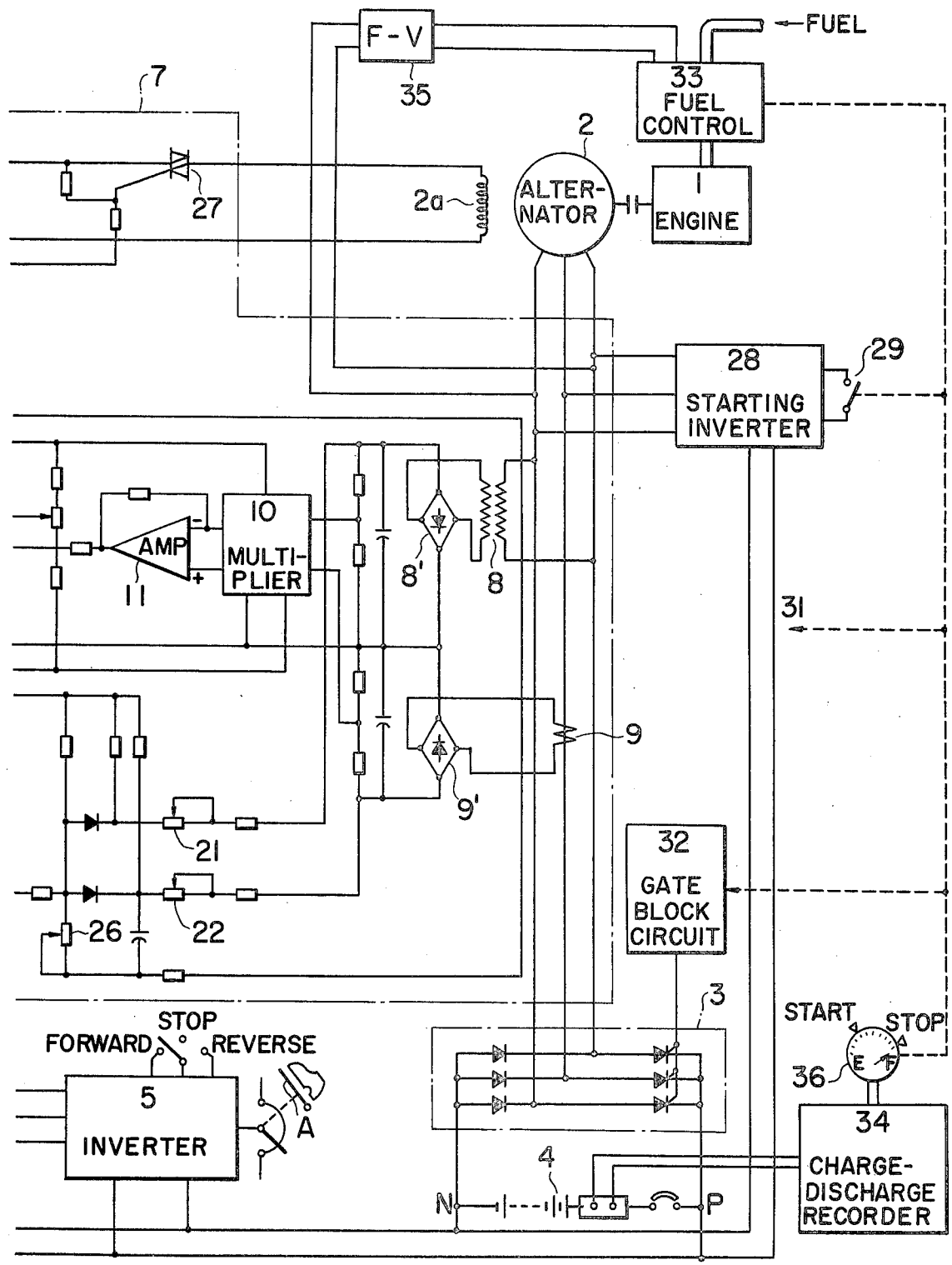

One embodiment of this invention will now be described with reference to FIGS. 2a and 2b including the main circuit shown in FIG. 1 and the novel control circuit embodying the invention.

The AC output voltage of alternator 2 is coupled through a potential transformer 8 and the generator current coupled through a current transformer 9. The second outputs of the potential and current transformers are rectified by rectifiers 8' and 9', respectively, filtered and then applied to a multiplier 10 to obtain a signal corresponding to the output power of the alternator. The output from the multiplier 10 is applied to a first stage amplifier 11 and a second stage amplifier 12 successively. The generator output applied to the second stage amplifier 12 is set to a predetermined value by a variable resistor 13 energized by a source of constant voltage 30 and utilized to adjust the gain of the amplifier 12. The second stage amplifier 12 is provided with a time constant setting circuit comprising a capacitor 14 and a variable resistor 15 for delaying the action of the amplifier so that it will not respond to a transient load variation.

The output from amplifier 12 is applied to the base electrode of a transistor 16 via a Zener diode 16a which determines the operating point of transistor 16 and a resistor 16b. The output from transistor 16 is applied to one input of a comparator 17 through a diode 16c to be compared with a saw tooth wave of a predetermined frequency from an oscillator 18. The output from comparator 17 is applied via transistor 19 to the base electrode of a transistor 20 connected in series with the field winding 2a of alternator 2 for controlling the field current by varying the width of the pulse current supplied thereto thus regulating the alternator voltage.

The outputs of the potential transformer 8 and the current transformer 9 are also applied to one input of an amplifier 23 respectively through a variable resistor 21 for setting a voltage limit and a variable resistor 22 for setting a current limit of the alternator, and the output from amplifier 23 is supplied to the base electrode of transistor 24 via a Zener diode 24a which sets the operating point of transistor 24. The output of transistor 24 is also compared with the saw tooth wave from oscillator 18 by comparator 17. In this manner, the voltage and current of the alternator are limited to predetermined values. The output of a shunt 25 connected in series with the field winding 2a of the alternator 2 is applied to the input of the amplifier 23 to act as a feedback signal through a variable resistor 26 for limiting the field current. Further, a semiconductor switch shown as a triac 27 is connected in series with the field winding for preventing the voltage induced in the field winding from being applied to other portions of the field circuit when the alternator 2 is started to act as a starting motor for the engine by connecting it to the battery 4 through a starting inverter 28. The triac 27 is supplied with a gate signal from the source of constant voltage 30. The starting switch 29 of the starting inverter 28 and the starting switch 31 of the source of constant voltage 30 are interlocked with each other as shown by dotted lines. The full wave rectifier 3 is connected across the output terminals of alternator 2 for charging battery 4. The gate block circuit 32 of rectifier 3 is interlocked with the starting switch 29 for the purpose of preventing circulating current from flowing through rectifier 3 and starting inverter 28 at the time of starting the engine 1 and the fuel control device 33 of the engine 1 and the charge-discharge recording device 34 of the battery 4 are also interlocked with each other.

When the residual capacity of the battery decreases so that it is necessary to recharge the battery by the alternator 2, the engine 1 is started automatically through starting inverter 28 and alternator 2 (now acting as a motor) under the control of the charge-discharge recording device 34 including a meter relay 36. Once the engine has started, the frequency of the alternator is detected by a frequency-voltage converter 35 and the fuel control device 33 of engine 1 is controlled by the output of the frequency-voltage converter 35 such that the engine rotates at a definite speed irrespective of the magnitude of the load. When the battery is fully charged, the engine 1 is stopped by the charge-discharge recording device 34.

When starting inverter 28 is operated by closing switch 29, switch 31 interlocked therewith is opened to deenergize constant voltage source 30. Consequently, the negative bias voltage applied to the gate electrode of triac 27 is removed thus rendering it OFF whereby the voltage induced in the field winding 2a of alternator 2 cannot pass current to the source of field current (battery 4 in this case).

Figure 3:
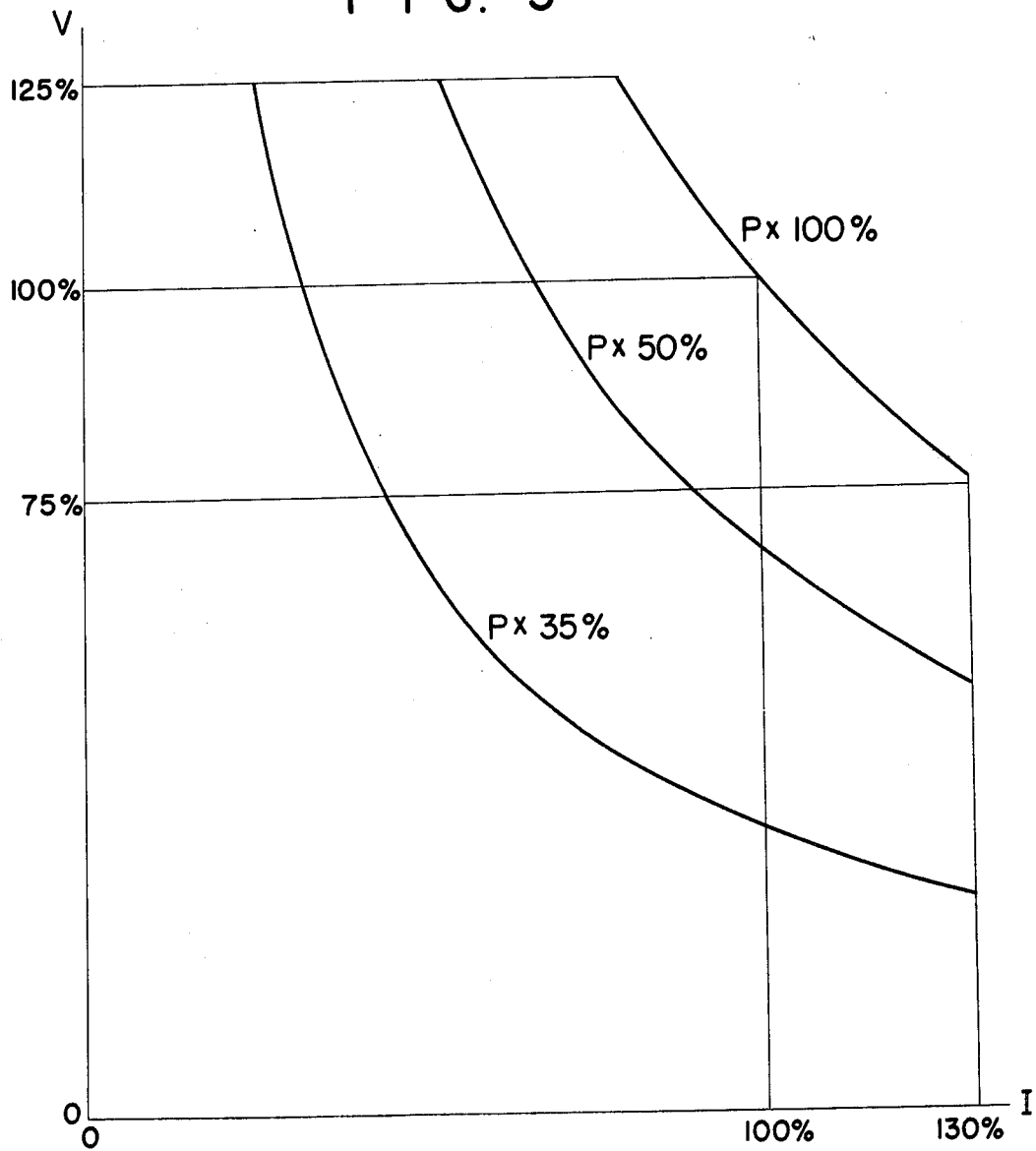
FIG. 3 is a graph showing the voltage-current characteristics of the generator when its output is controlled to be constant.

As above described, according to this invention even when the load of the driving motor 6 varies in accordance with the load variation specific to the motor car the load of the engine is maintained at a constant value because the control circuit provides a constant output control for the alternator. The fuel efficiency of a conventional motor car is only about 10% when it runs through a city area whereas according to this invention it is possible to increase the fuel efficiency to about 80% under the same operating condition. Moreover, so long as the residual capacity of the battery is high, the engine and alternator are not operated thus further saving the fuel. Of course, it is possible to charge the battery from a low cost commercial source of electric powder when it is housed in a garage. Further, as shown in FIG. 3, to have a best coordination with the charge-discharge characteristics of the battery the maximum voltage of the alternator is limited to the end voltage of charging and the maximum current of the alternator is limited to a value to which the alternator is durable for a short time. In FIG. 3 the abscissa represents the percentage of generator current I and the ordinate the generator terminal voltage V and in which the range of the battery terminal voltage was assumed to be within a range of from 75 to 125% of the rated voltage and the maximum current of the alternator was 130% of the rated current. The curves shown in FIG. 3 show how the generator current and voltage vary in accordance with the charge and discharge conditions of the battery when the generator output is controlled to be constant, in this case 35%, 50% and 100% of the rated output power P of the generator.

Furthermore, as above described since the permissible maximum field current is also limited it is possible to prevent burn out of the field winding. It is also possible to set the load condition of the alternator 2 to any condition by adjusting the variable resistor 13 in accordance with the running pattern of the car. For example, if the car is to be run at high speed over a long distance the variable resistor 13 is set to produce a maximum output. In this case, where a compact and economical design is adopted for the control circuit it is possible to minimize the engine capacity, alternator capacity and battery capacity. Where a current collecting device that collects current from a trolley wire layed along a road is provided for the motor car, it is possible to operate the car according to a so-called dual mode system; that is the self-running mode and the running mode by taking the power from the trolley wire.

Although in the illustrated example the generator 2 was illustrated as a three phase alternator it will be clear that a DC generator can also be used in which case rectifier 3 is not necessary. Further, it is possible to substitute a DC motor for the three phase induction motor in which case the motor current can be controlled by means of a semiconductor chopper, such as a thyristor. A three phase synchronous motor can also be substituted for the three phase induction motor and can be controlled by a control circuit identical to that described above. Instead of starting the engine by operating the generator as a motor through the starting inverter 28, it is also possible to start the engine by a conventional starting motor energized by the battery. In this case the triac 27 and the gate block circuit 32 are not necessary and it is not necessary to construct rectifier 3 as the mixed bridge type as shown in FIG. 2 in which one half of the rectifier elements are provided with gate electrodes. Instead of detecting the voltage and current of the alternator on the AC side it is also possible to detect them on the DC output side of the rectifier. The triac 27 provided for the purpose of preventing the adverse effect of the voltage induced in the circuit of the generator field winding can be replaced by a thyristor where the control circuit is suitably modified. Further, instead of starting and stopping the engine by charge-discharge recording device 34 and meter relay 36 the engine can be manually started and stopped by the operator who confirms the residual capacity of the battery by means of the terminal voltage for example.

I claim:

1. A control apparatus for an electric motor car wherein a generator is driven by a fuel engine, the driving motor of the car is energized by said generator, and a battery is connected in parallel with said motor to be float-charged by said generator, said control apparatus comprising means for detecting the electric output power of said generator including a first detector for detecting the voltage of said generator, a second detector for detecting the current of said generator, and a multiplier for multiplying the output of said first detector and the output of said second detector thereby producing a signal proportional to the output power of said generator;

means including a first variable resistor which is set in accordance with the running condition of said car for producing an output which varies as a variable function of the output from said generator output power detecting means;

means for producing a reference signal;

means for comparing said variable output with said reference signal for adjusting the field current of said generator thereby maintaining the output of said generator at a substantially constant value irrespective of the running condition of said car;

an amplifier;

a second variable resistor for applying the output of said first detector to said amplifier for setting a voltage limit of said generator;

a third variable resistor for applying the output of said second detector to said amplifier for setting a current limit of said generator;

means for applying the output from said amplifier to said comparing means for comparing with said reference signal; and means connected in the circuit of the field winding of said generator to apply a feedback signal proportional to the field current to said amplifier thereby limiting the field current to a predetermined value.

2. A control apparatus for an electric motor car wherein an alternator is driven by a fuel engine, and alternating current motor for driving said car is energized by said alternator through a series connected rectifier and inverter, and a battery is connected in parallel with said inverter for float charging, said control apparatus comprising a potential transformer for detecting the voltage of said alternator;

a current transformer for detecting the current of said alternator;

a multiplier for multiplying the output of said potential transformer with the output of said current transformer thereby producing a signal proportional to the output power of said alternator, a first amplifier connected to amplify said signal;

means including a first variable resistor which is set in accordance with the running condition of said car for varying the gain of said first amplifier;

a second amplifier;

a second variable resistor for applying the output from said potential transformer to said second amplifier for setting the voltage limit of said alternator;

a third variable resistor for applying the output of said current transformer to said second amplifier for setting the current limit of said alternator;

a reference signal source;

a comparator for comparing the outputs of said first and second amplifiers with said reference signal;

means responsive to the output from said comparator for controlling the field current of said alternator;

a starting inverter connected between said alternator and said battery; and means responsive to the residual capacity of said battery for operating said starting inverter, thereby causing said alternator to operate as a motor for starting said engine.

3. A control apparatus for an electric motor car wherein an alternator is driven by a fuel engine, an alternating current motor for driving said car is energized by said alternator through a series connected rectifier and inverter, and a battery is connected in parallel with said inverter for float charging, said control apparatus comprising a potential transformer for detecting the voltage of said alternator;

a current transformer for detecting the current of said alternator;

a multiplier for multiplying the output of said potential transformer with the output of said current transformer thereby producing a signal proportional to the output power of said alternator;

a first amplifier connected to amplify said signal;

means including a first variable resistor which is set in accordance with the running condition of said car for varying the gain of said first amplifier;

a second amplifier;

a second variable resistor for applying the output from said potential transformer to said second amplifier for setting the voltage limit of said alternator;

a third variable resistor for applying the output of said current transformer to said second amplifier for setting the current limit of said alternator;

a reference signal source;

a comparator for comparing the outputs of said first and second amplifiers with said reference signal;

means responsive to the output from said comparator for controlling the field current of said alternator; and a shunt connected in series with the field winding of said alternator for applying a feedback signal proportional to the field current to said second amplifier thereby limiting the field current to a predetermined value.

* * * * *